United States Patent [19]
Schaffer, Jr. et al.

[11] Patent Number: 5,569,543
[45] Date of Patent: Oct. 29, 1996

[54] METHOD FOR COATING A BRAKE ROTOR AND BRAKE ROTOR

[75] Inventors: Parke Schaffer, Jr.; Thomas Laughin, both of Malvern, Pa.; David M. Mann, Wolverine Lake, Mich.

[73] Assignees: Inorganic Coatings, Inc., Malvern, Pa.; Ford Motor Company, Dearborn, Mich.

[21] Appl. No.: 331,965

[22] Filed: Oct. 31, 1994

[51] Int. Cl.$^6$ ...................................................... B22F 3/00
[52] U.S. Cl. .......................... 428/552; 427/290; 427/292; 427/309; 427/319; 427/321; 427/328; 427/387; 427/388.4; 427/397.8; 428/553; 428/562
[58] Field of Search ............................... 427/290, 309, 427/328, 292, 319, 321, 387, 388.4, 397.8; 428/552, 553, 562

[56] References Cited

U.S. PATENT DOCUMENTS 4,162,169  7/1979  Schutt ........................................ 106/74

*Primary Examiner*—Bernard Pianalto
*Attorney, Agent, or Firm*—Weintraub, DuRoss & Brady

[57] ABSTRACT

A method and composition for coating an automotive brake rotor to render it corrosion resistant without impeding the braking function of the rotor, includes cleaning the rotor and thereafter applying a coating composition thereto which composition includes an inorganic alkali metal-silicate binder and a finely divided metal admixed therewith.

13 Claims, No Drawings

METHOD FOR COATING A BRAKE ROTOR AND BRAKE ROTOR

BACKGROUND OF THE INVENTION

1. Field of the Invention

The present invention relates to a method and composition for coating metal workpieces with a corrosion-resistant coating. More particularly, the present invention relates to method and composition for rendering a vehicular brake rotor corrosion resistant. Even more particularly, the present invention concerns an alkali metal-silicate based coating composition and method of using same for rendering a vehicular brake rotor corrosion-resistant.

2. Prior Art

Metal parts are often used in industrial as well as automotive applications. Oftentimes, such metal parts encounter environments in which corrosion, due to salt spray or environmental exposure, may be a problem. Therefore, it is relatively common to coat such metal parts with a protective coating to inhibit corrosion from occurring.

Currently used methods of coating such metal parts ordinarily requires a cleaning step to clean oil, grease, etc. from the part, an intermediate pretreatment step, which normally involves pre-coating the metal part with zinc phosphate or similar treatment, and then a third step of applying the protective coating to the metal part.

This intermediate step of phosphating or otherwise treating (usually referred to as passivating is expensive and time consuming. Moreover, traditionally the subsequent coating composition must be compatible with the passivated surface.

Thus, even though numerous types of corrosion inhibiting coating compositions are known, a need still exists in the art for a method of coating metal parts in which the intermediate step of plating the metal workpiece with zinc phosphate or the like is eliminated in order to simplify the process and to cut down on the time required to coat metal workpieces.

Within the context of corrosion resistance one of the more difficult problems encountered is rust or corrosion of vehicular or automotive brake rotors on the braking surface, after the vehicle has been delivered the dealer and prior to customer purchase. Heretofore, it was believed that the coating of the braking surface of a brake rotor was to be avoided to preclude any deleterious or adverse effect on braking. Thus, previous brake rotor coatings were either removed at the factory prior to vehicle delivery or removed upon initial brake applications. Yet, the corrosion of the brake rotor surfaces and its accompanying "warranty" problems is expensive and time consuming. Thus, it is apparent that a major advance in the art would be achieved by a corrosion-inhibiting coating composition which could be effectively applied to the entire vehicular brake rotor while providing protection often from about fifty to about one hundred brake applications. It is to this to which the present invention is directed.

SUMMARY OF THE INVENTION

The present invention provides a composition and method for coating an automotive brake rotor including the braking surface with a corrosion resistant coating, in which the conventional pretreatment step is eliminated.

The method in accordance with the present invention, generally, comprises the steps of:

(a) cleaning the entire brake rotor to remove substantially all impurities therefrom; and (b) following the cleaning step, and without any intervening pretreatment step, applying a coating composition to the rotor, the coating composition comprising (i) in admixture, an aqueous-based alkali metal-silicate binder and (ii) a powder metal.

The cleaning step in accordance with the present invention may be accomplished by blasting the rotor with an abrasive material; by immersing the rotor in an acid solution followed by aqueous rinsing and air drying by immersion in an alkaline solution followed by an aqueous rinse and drying; or by steam cleaning the rotor, or the like. Advantageously, the coating composition is a two part system of: (a) binder, and (b) metallic powder.

In a preferred embodiment of the present invention, the powder metal coating composition is finely divided metallic zinc which is added to the aqueous-based alkali metal-silicate binder.

For a more complete understanding of the present invention, reference is made to the following detailed description section, and to the examples contained therein. Throughout the following description, all parts are intended to be by weight of the total composition, absent indications to the contrary.

DETAILED DESCRIPTION OF THE PREFERRED EMBODIMENT

It has been discovered, in accordance with the present invention, that if a vehicular brake rotor is coated with a composition which comprises (1) an aqueous-based alkali metal-silicate binder and (2) a powdered metal, good corrosion resistance can be obtained without deleteriously or adversely effecting the braking function.

The present coating can remain on the rotor through the first fifty to one hundred braking applications without impairment of the braking function while precluding the corrosion thereof. Moreover, the coating composition effectively eliminates any need for pretreating the rotor with zinc phosphate or other intermediate surface preparation subsequent to cleaning, to achieve the results hereof. This latter discovery is surprising, since the standard practice in the industry requires the use of a separate zinc phosphate or similar pretreatment step prior to the application of any protective coatings which is intended to impart corrosion resistance. Moreover, the discovery that the present coating does not interfere with the braking function provides an effective means for substantially reducing consumer warranty claims.

The corrosion resistant coating in accordance with the present invention includes an alkali metal-silicate binder such as that described in U.S. Pat. No. 4,162,169 issued Jul. 24, 1979 to Schutt, the disclosure of which is hereby incorporated by reference.

The binder contemplated herein employs an aqueous potassium silicate or sodium silicate dispersion having a silicon dioxide to alkali-metal oxide mole ratio of from 4.8:1 to 6.0:1. The relatively high mole ratio is achieved primarily through the inclusion of a silicone compound. The binder exhibits good storage stability.

As noted, the coating composition further comprises a finely divided or powdered metal admixed therewith, such as zinc, aluminum, copper, the oxides thereof, including both cupric oxide and cuprous oxide, as well as mixtures thereof.

In a particularly preferred embodiment hereof, the coating composition hereof is a two part composition. The first part being the alkali metal-silicate binder and the second part being the metal. The binder comprises, preferably, a potassium silicate carrier having from about 30 percent, by weight, potassium silicate and other ingredients substantially in accordance with the teaching of Schutt. Additionally, the first part or binder includes minor amounts of water in an amount ranging from about 1 percent to about 5 percent by weight, based on the total weight of the first part. Additionally, silicone may be included therewith. Where used the silicone is present in an amount ranging from about 0.5 percent to about 5 percent, by weight based on the total weight of the first part and, preferably, from about 1 to about 3 percent, by weight, based on the total weight of the first part.

As noted, the second part of the coating composition is the metal component and, preferably, includes from 75 percent to about 95 percent zinc dust, as a finally divided metallic zinc, and minor amounts of other metals and metal salts such as zinc oxide, copper, cuprous and cupric oxide, aluminum, etc., and mixtures thereof.

The coating composition is prepared by adding the metallic dust to the binder with high speed agitation to effect a homogeneous dispersion. Generally, the binder and metallic dust are present in a, respectively, weight ratio of from about 1:2.5 to about 1:4. Of course, other ratios may be employed depending on the operating conditions. The composition is a sprayable coating which can effectively preclude corrosion of a brake rotor without effecting the braking functioning.

The coating composition contemplated for use herein is commercially available from Inorganic Coatings incorporated of Malvern, Pa. under the mark "IC 531 Automotive TF."

It is essential to the practice of the method of the present invention that the entire rotor be thoroughly cleaned to remove substantially all impurities from all the surfaces thereof before the coating is applied thereto. Cleaning of the rotor can be accomplished in several different ways. First, the rotor can be cleaned by blasting the rotor with an abrasive material such as aluminum oxide, or the like. Secondly, the rotor may be cleaned by electrocleaning. Likewise, the rotor may be cleaned by immersion in an acidic solution, such as hydrofluoric acid and thereafter rinsing the rotor with water and then drying it. Also, the rotor may be cleaned by washing in a caustic alkaline cleaning compound and, thereafter, rinsing the rotor with water and, then, drying it, either with warm air or with ambient air.

A suitable alkaline cleaning composition is that sold under the mark "SUPER SOAK" and which is available from the Allied-Kelite Division of Witco Corporation in Melrose Park, Ill. A suitable acidic cleaning solution which is usable in the acidic phase of the cleaning operation in accordance with the present invention is sold under the mark "ISOPREP 192" and is also available from the Allied-Kelite Division of Witco Corporation in Melrose Park, Ill.

Electrocleaning is achieved by immersing the rotor in a liquid alkaline electrocleaner, such as that sold by the Allied-Kelite Division of Witco Corporation under the mark "ISOPREP 552-L", and providing an electrical current through the cleaning solution of between 10 and 80 amperes per square foot to electroclean the workpieces. After removal from the alkaline electrocleaner solution, it is necessary to rinse the parts with water and also to dry the parts with either warm air or ambient air.

Of course, other cleaning methods can be employed herein.

Alternatively, the rotor may be cleaned with steam cleaning wherein the rotor is subjected to a jet steam spray for about one to about ten minutes to wash off any organic impurities from the surface of the rotor.

Thereafter, the rotor has the coating applied thereto. The coating may be applied by any suitable mode, such as immersion, manual application, spraying or the like. Preferably, the coating is applied by spraying.

Generally, the coating is applied to the rotor at ambient conditions. The rotor, itself, is at an elevated temperature of about 90° F. to about 110° F. to accelerate curing. Of course, if the rotor, itself, is sprayed at ambient temperature, when sprayed, the curing time will be longer.

When the rotor is at the elevated temperature, the coating composition cures in about ten to about fifteen minutes at ambient temperatures to a hard corrosion resistant coating.

In coating a rotor, generally a coating of from about 0.3 to a about 2.5 mils is applied thereto.

As noted hereinabove, when mixing the powdered zinc with the silicate material, it is preferred that the zinc be added to the silicate rather than vice versa. A power mixer is employed to continuously agitate the silicate material and create a vortex therein, while the zinc powder is added thereto. The two components may be mixed at ambient temperature and pressure. The coating composition hereof is a water-based composition and water is the only solvent which is required. The mixture may be diluted with water to any appropriate sprayable constituency, as desired, for a particular application. Conventional spray equipment may be used.

As noted, it has been discovered, in accordance with the practice of the present invention, that the necessity for a pretreatment of the rotor with zinc phosphate is obviated and becomes unnecessary. Therefore, the method of the present invention specifically moves from a cleaning step to a coating application step without any intervening pretreatment step. However, if desired, a water-soluble corrosion inhibitor. For example, an alkaline or caustic-based corrosion inhibitor, a silicated corrosion inhibitor or and, preferably, a caustic-silicate type corrosion inhibitor such as that sold by the Allied-Kelite Division of Witco Corporation under the mark "ISOPREP 225", may be added as an adjuvant to the cleaning solution. This water-soluble corrosion inhibitor may, also, alternatively, and, preferably, be used in the final rinse water which is applied to the workpiece before the drying and coating is performed.

Where used in the rinse water, the corrosion inhibitor is present in an amount ranging from about 5 to about 25 percent, by volume, based on the total volume of rinse water. Preferably, the rinse water comprises from about 10 to about 20 percent, by weight, of the inhibitor and the balance being water.

For a more complete understanding of the present invention, reference is made to the following illustrative example. In the example, all parts are by weight absent contrary indications.

EXAMPLE I

This example illustrates the coating of a brake rotor in accordance herewith.

A brake rotor is blasted with aluminum oxide particles for about 10 seconds to prepare the surface. Thereafter, a coating composition sold under the name IC 531 Automotive TF is prepared by adding with agitation at about 500 rpms, using a high speed vortex mixer, zinc dust to the silicate binder component in a weight ratio of 2.62 to 1 to prepare a 100 parts batch.

The rotor is, then, heated to 100° F. and coating is, then, sprayed onto all surfaces of the rotor. After 15 minutes a hard, cured coating is deposited on the rotor.

The so-sprayed rotor is then placed on a vehicle and driven under normal driving conditions. After the brakes have been applied, without any deleterious effect for about 75 times, no corrosion is evidenced.

From the preceding it is to be appreciated that the present invention provides a corrosion resistance coating for a vehicular brake rotor which does not impair or impede braking function through the first up to about 100 applications of the brakes.

Having, thus, described the invention, what is claimed is:

1. A method of coating a brake rotor with a corrosion-resistant coating comprising the steps of:
   (a) cleaning the rotor to remove substantially all surface impurities therefrom;
   (b) thereafter applying to the rotor a coating composition comprising: (i) an aqueous-based inorganic alkalki metal-silicate binder comprising an alkalkine metal-silicate, silicone and water, and (ii) a powdered metal;
   (c) drying the coating to remove the water therefrom; and
   (d) wherein the process is conducted in the absence of a treatment step intermediate the cleaning and the coating application.

2. The method of claim 1, wherein:
   the rotor is cleaned by blasting the workpiece with an abrasive material.

3. The method of claim 1, wherein:
   the rotor is cleaned by:
   (a) applying an acidic compound to the rotor; and
   (b) thereafter, rinsing the workpiece with water.

4. The method of claim 1, wherein the rotor is cleaned by:
   (a) applying a caustic alkali compound to the rotor;
   (b) applying an acidic compound thereto, and
   c) thereafter rinsing the rotor with water.

5. The method of claim 1, wherein the metal is zinc.

6. The method of claim 1 which further comprises curing the coating on the rotor after application thereonto.

7. The brake rotor resulting from the method of claim 6.

8. The brake rotor of claim 7 wherein:
   the metal and the binder are present in a respective weight ratio of from 2.5:1 to about 4:1.

9. A method of coating a brake rotor with a corrosion-resistant coating comprising the steps of:
   (a) cleaning the rotor to remove substantially all surface impurities therefrom;
   (b) thereafter applying to the rotor a coating composition comprising: (i) an aqueous-based inorganic alkali metal-silicate binder comprising an alkaline metal-silicate, silicone and water, and (ii) a powder selected from the group consisting of a metal, an oxide of the metal, and mixtures thereof;
   (c) drying the coating to remove the water therefrom; and
   (d) wherein the process is conducted in the absence of a treatment step intermediate the cleaning and the coating application.

10. The method of claim 9, wherein the powder comprises a metal selected from the group consisting of zinc, copper, and aluminum.

11. The method of claim 10, wherein the metal is present with respect to the binder in a weight ratio of from about 2.5:1 to about 4:1.

12. The method of claim 11 wherein:
    the powdered metal is zinc.

13. The method of claim 12 wherein:
    the alkali metal-silicate is zinc silicate.

* * * * *